United States Patent [19]
Jensen

[11] Patent Number: 5,879,425
[45] Date of Patent: Mar. 9, 1999

[54] METHOD FOR FABRICATION OF MICROCHANNEL MULTIPLIER PLATES

[75] Inventor: Floyd J. Jensen, Saratoga, Calif.

[73] Assignee: Litton Systems, Inc., Woodland Hills, Calif.

[21] Appl. No.: 182,249

[22] Filed: Sep. 20, 1971

[51] Int. Cl.⁶ .................................................. C03B 37/022
[52] U.S. Cl. .............................. 65/393; 65/410; 65/472; 65/473
[58] Field of Search .................................. 65/31, DIG. 7, 65/393, 410, 472, 473

[56] References Cited

U.S. PATENT DOCUMENTS

| | | | |
|---|---|---|---|
| 3,216,807 | 11/1965 | Woodcock | 65/4 |
| 3,226,589 | 12/1965 | Woodcock | 65/DIG. 7 |
| 3,275,428 | 9/1966 | Siegmund | 65/31 |
| 3,279,903 | 10/1966 | Siegmund | 65/4 |
| 3,281,294 | 10/1966 | Martin | 156/24 |
| 3,294,504 | 12/1966 | Hicks, Jr. | 65/3 |
| 3,380,817 | 4/1968 | Gardner | 65/31 |
| 3,395,006 | 7/1968 | Hopkins et al. | 65/12 |
| 3,502,455 | 3/1970 | Gardner | 65/31 |
| 3,505,039 | 4/1970 | Roberts et al. | 29/191.6 |
| 3,556,636 | 1/1971 | Roberts et al. | 65/DIG. 7 |
| 3,558,377 | 1/1971 | Tantillo | 65/31 |
| 3,678,328 | 7/1972 | Cross et al. | 315/12 |
| 3,693,005 | 9/1972 | Clement | 313/103 |
| 3,979,621 | 9/1976 | Yates | 313/105 |
| 4,031,423 | 6/1977 | Siegmund | 313/105 |
| 4,101,303 | 7/1978 | Balkwill | 65/31 |
| 4,385,092 | 5/1983 | Singer, Jr. | 428/188 |

*Primary Examiner*—Peter A. Nelson
*Attorney, Agent, or Firm*—Stanley Z. Cole; Patrick Bright

[57] ABSTRACT

A rod of etchable core glass material is inserted within a lead glass sleeve and heated in a furnace to drawing temperature and drawn from the furnace into a fiber. The lower end of the glass sleeve is collapsed around the core glass, thereby sealing the sleeve to the core rod. A vacuum is drawn on the space between the rod and the sleeve while in the furnace for outgassing the rod and sleeve and for eliminating gas tending to be trapped between the core fiber and its sleeve. In a subsequent step, a multitude of such glass fibers are assembled in a bundle, inserted within an evacuable glass sleeve, and heated to the softening point while drawing a vacuum on the bundle of fibers and the interior of the sleeve for further outgassing of the fibers. While the assembly is in the furnace, the exterior of the sleeve is pressurized to fuse the assembly of glass fibers together and to the sleeve to form a final boule which is subsequently transversely sliced to form plates which are etched to remove the core glass.

9 Claims, 1 Drawing Sheet

U.S. Patent    Mar. 9, 1999    5,879,425
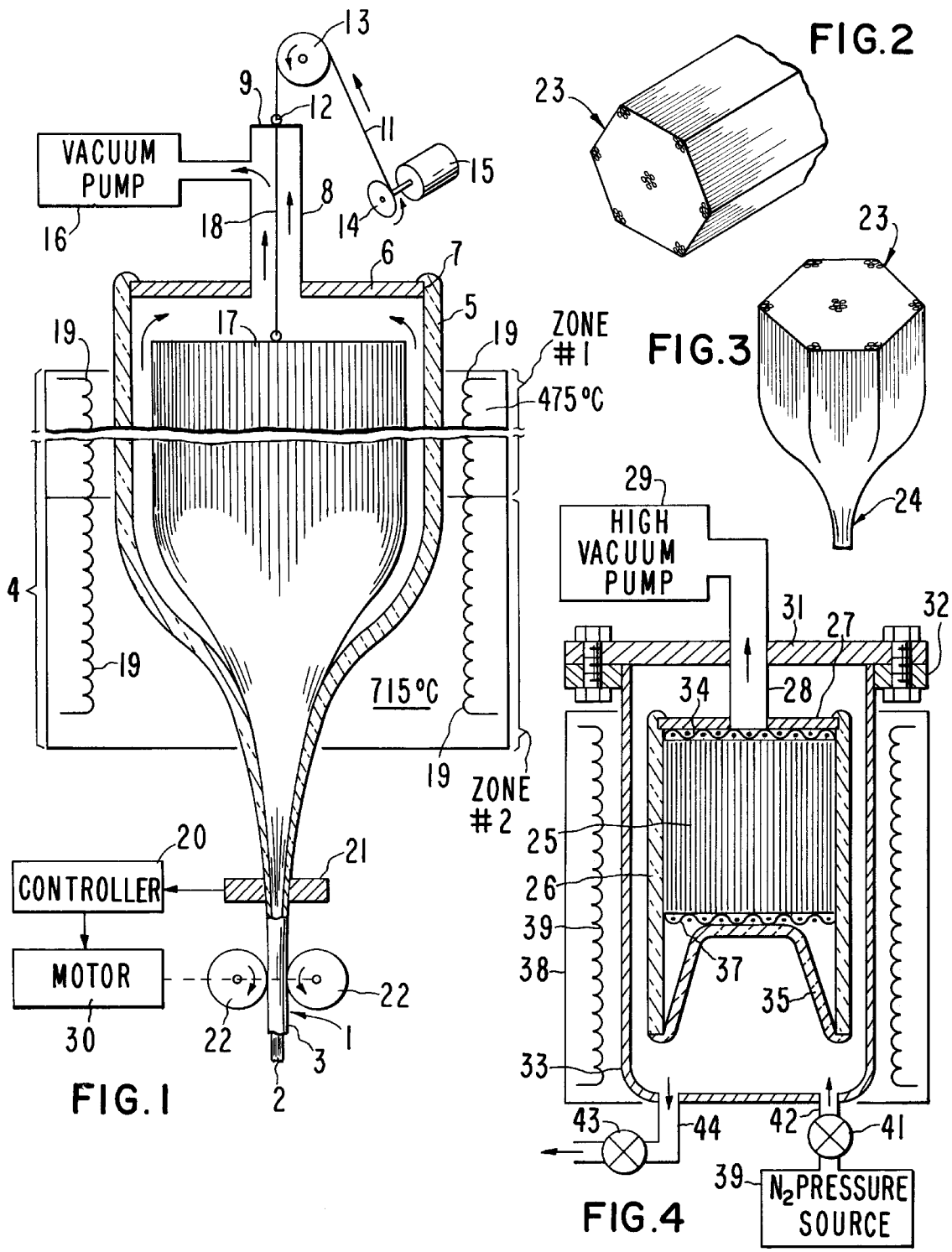

METHOD FOR FABRICATION OF MICROCHANNEL MULTIPLIER PLATES

GOVERNMENT CONTRACT, CONTRACT No. DAAK02-68-C-0367

The invention herein described was made in the course of a contract with the Department of the Army representing the Department of Defense.

DESCRIPTION OF THE PRIOR ART

Heretofore, microchannel electron multiplier plates have been fabricated by heating a rod of core glass material surrounded by a sleeve of cladding glass material in a glass drawing furnace. The glass is drawn from the bottom of the furnace in the atmosphere for fusing the core glass to the surrounding glass sleeve to produce a glass clad glass fiber of relatively small cross section, i.e., with a cross sectional dimension as of 0.030 inches. The glass fiber is then cut into 12" to 18" lengths and assembled into a bundle, heated in a furnace and pressed for tacking the individual fibers together. The bundle is then heated in a furnace and drawn to form a composite rod or fiber of hexagonal cross section having a multitude of a micron sized individual fibers therein. The composite fibers are assembled into a second bundle. The second bundle is assembled within a pressing fixture and the assembly is heated to the softening point and pressed together for fusing the individual composite glass fibers together and to the surrounding sleeve. The composite fused bundle is then sliced transversely to form a multitude of plates which are etched to remove the core glass leaving a channelized plate. The channelized plate is treated in a reducing atmosphere to render the inside bores of each of the channels semiconductive and electrodes are affixed to opposite sides of the plate to form a microchannel plate. The microchannel plate is used, for example, in an evacuated image intensifier tube between the photocathode pickup screen and the output fluorescent screen for electron multiplication to increase the gain of the tube.

Such a prior method for fabrication and use of microchannel plates is disclosed in an article titled "The Production of Electron-multiplier Channel Plates" appearing in Volume 30, No. 8/9/10 of the Philip's Technical Review of 1969, pages 252–255.

The problem of the prior art method for fabrication of microchannel electron multiplier plates is that when the single glass clad fibers are drawn in a gaseous atmosphere, gas tends to be trapped at the interface of the core glass and the cladding glass sleeve. In addition, gas otherwise t-rapped in the core glass and glass sleeve introduces imperfections in the-fibers and in the final microchannel plate fabricated according to this method. Also when the composite fibers are fused together to form the final boule, which is to be subsequently sliced into the microchannel. plates, gas is trapped at We interfaces of the composite fibers introducing further distortions and discontinuities. In addition, the prior art mechanical, method for pressing together the composite fibers to form the final boule did not provide sufficient uniformity of the pressure throughout the array of composite fibers, thereby producing voids and distortions in the boule. Moreover, when the microchannel plates were employed in evacuated image intensifier tubes, trapped gases evolved from the plate to deleteriously affect performance and life of the photocathode.

SUMMARY OF THE PRESENT INVENTION

The principal object of the present invention is the provision of an improved method for fabrication of microchannel electron multiplier plates.

In one feature of the present invention, the final boule, which is to be sliced into the microchannel plates for etching to remove the core glass, is formed by heating a bundle of composite glass fibers inside a surrounding glass sleeve and evacuating the space within the sleeve for outgassing the sleeve and the array of fibers therein prior to pressing and fusing of the individual fibers, whereby absorbed and adsorbed gasses are removed from the final boule.

In another feature of the present invention the final boule of composite glass fibers is fused together by heating the boule in a surrounding glass sleeve while evacuating the sleeve and boule. The pressure externally of the evacuated sleeve is raised to produce a uniform compressive force on the sleeve and the fibers therein to produce uniform fusing of the glass fibers within the boule.

In another feature of the present invention, the individual glass fibers which are to be utilized in the fabrication of the microchannel plate are formed by heating an etchable core glass rod and a surrounding cladding glass sleeve in a drawing furnace to a temperature slightly above the softening point of the two glasses such that when the glass rod and sleeve are drawn together from the furnace the sleeve is collapsed on the core glass rod, thereby sealing same. A vacuum is drawn on the sealed space between the core glass rod and the sleeve for outgassing the rod and sleeve and for removing absorbed and adsorbed gasses from the interface of the core glass and cladding glass sleeve.

Other features and advantages of the present invention will become apparent upon a perusal of the following specification taken in connection with the accompanying drawing wherein:

BRIEF DESCRIPTION OF THE DRAWING

FIG. 1 is a schematic line diagram, partly in section and partly in block diagram form, depicting an apparatus for drawing a single glass clad fiber according to the method of the present invention, FIG. 2 is a perspective view of a bundle of glass clad fibers such bundle having an hexagonal cross section, FIG. 3 is a perspective view depicting the drawing of the assembly of FIG. 2 into a composite fiber of reduced cross-sectional dimensions, and FIG. 4 is a schematic longitudinal sectional view, partly in block diagram form, depicting a method and apparatus for fusing an assembly of fibers of FIG. 3 into a final boule.

DESCRIPTION OF THE PREFERRED EMBODIMENTS

Referring now to FIG. 1, there is shown a method and apparatus for drawing individual glass clad fibers 1 to be employed for subsequent manufacture of microchannel electron multiplier plates. The individual glass clad fibers 1 include a core glass member 2 made of an etchable glass, i.e., chemically soluble glass, such as LaK-3 type glass made by Jenaer Glaswerk Schott & Gen., of Mainz, Germany, and commercially available from United Lens Company of Massachusetts. The etchable glass core fiber 2 is clad by a sleeve of cladding glass 3 which is chemically more stable than the core and preferably a conductive glass such as lead glass consisting of between 60 and 85% lead oxide by weight. A suitable lead glass is type 8161 commercially available from Corning Glass Company.

Selective etching of the core glass is performed as is well known in the art, as for example is described at Col. 3, line 64 through Col. 4, line 5 of U.S. Pat. No. 4,101,303 issued to J. T. Balkwill; Col. 5, lines 40–67 of U.S. Pat. No. 3,275,428 issued to W. P. Siegmund; and/or Col. 3, lines 35–47 of U.S. Pat. No. 3,380,817 issued to W. L. Gardner.

Glass fiber 1, as of 0.030 inches in outside diameter, is drawn from a glass drawing furnace 4 as follows: a sleeve 5 of cladding glass material, as of 1.32 inches in outside diameter, 1.0 inches inside diameter, and 48 inches long, is sealed by a glass-to-metal seal around the periphery of a centrally apertured disc 6 at 7. A stainless steel tube 8 is centrally joined to disc 6 in gas communication with the central aperture in the disc 6. The tube 8 is closed in a gas tight manner at its outer end via cap 9 and is joined to a cable 11 via an eye 12 fixed to the cap 9. The cable 11 extends over a pulley 13 to a reel 14 driven from a motor 15 such that by controlling the speed of the motor 15 the cable 11 is released from the reel 14 at a controlled rate for lowering tube 8 with its attached sleeve of cladding glass 5 at a controlled rate into the furnace 4. A vacuum pump 16 is connected in gas communication with the tubing 8.

A rod of core glass 17, as of 0.950 inches in outside diameter and 28 inches long, is suspended within the glass sleeve 5 via a stainless steel wire 18 connected to the cap 9. The sleeve 5 with the internally suspended core glass rod 17 are lowered into a two zone glass drawing furnace 4 heated, for example, by a multitude of radiant heating elements 19. The glass drawing furnace 4 has a first zone heated to a temperature of approximately 475° C. and a second lower zone heated to a temperature of approximately 715° C. which is approximately 65° C. above the glass softening point for the core glass 17 and approximately 115° C. above the softening point of the cladding glass sleeve 5.

As the lower portion of the sleeve 5 and core glass rod 17 soften they tend to form a tear drop configuration with the sleeve 5 collapsing around the exterior of the core glass 17, thereby making a gas tight seal therebetween. As the core glass and sleeve are pulled together from the bottom of the furnace 4, a vacuum is drawn on the region between the core glass 17 and the outer sleeve 5 for outgassing of the sleeve and the core glass 17 and for removing absorbed and adsorbed gasses which might otherwise tend to be trapped between the core glass and the outer sleeve 5. A suitable vacuum is between 20 and 25 inches of mercury. To start the initial drawing process, the lower zone of the furnace is heated to approximately 800° C. which is approximately 250° C. above the softening point of the core glass. After the drawing has started the lower zone temperature is reduced to 715° C.

The glasses are drawn from the furnace through a sizing gauge 21 by means of a pair of drive wheels 22 driven from a motor, not shown. The sizing gauge provides an input gauging signal to a controller 20 which controls the speeds of a motor 30 driving the drive wheels 22 to attain the proper size of the fiber 1. The sleeve 5 and core glass rod 17 are lowered into the furnace 4 at a constant rate, as determined by the fixed speed of motor 15, at just a sufficient rate to supply the glass drawn via the drive wheels 22 from the glass melt. The glass fiber 1 is cut into lengths between 12 and 18 inches long. The resultant glass fiber 1 has a core fiber diameter which is approximately three--fourths of the total diameter of the fiber 1.

Referring now to FIG. 2 the glass clad fibers 1 are assembled within a carbon mold into a bundle 23 of hexagonal cross section. In the carbon mold, pressure is applied to all sides of the bundle. The bundle 23 is heated in a furnace to a temperature sufficient to tack each of the glass clad fibers to its neighbor. A suitable mold and method for tacking the individual glass clad fibers is disclosed and claimed in copending U. S. application, Ser. No. 141,532, filed 10 May 1971, issued Sep. 9, 1975, as U.S Pat. No. 3,904,343, which at the time of filing was assigned to the same assignee as the present invention.

Referring now to FIG. 3 the hexagonal bundle 23 of fibers, as of 1.456 inches in diameter between opposed flat faces and 0.841 inches on each flat side, is inserted within a glass drawing furnace of the type shown in FIG. 1 and drawn into a single composite fiber 24 having a cross sectional diameter of approximately 0.033 to 0.034 inches from one flat to the opposed flat. The hexagonal composite fibers 24, as of 4 inches in length, are then assembled in a hexagonal bundle or boule 25 similar to that shown in FIG. 2.

Referring now to FIG. 4 there is shown a method and apparatus for fusing the bundle of composite hexagonal fibers 24 together to form the final boule 25. More specifically, the boule 25, as of approximately 4 inches in length and of a typical diameter of approximately 1.24 inches, is inserted within a glass sleeve 26 having a softening point of 630° C. and being of a type 0120 glass commercially available from Corning Glass Company. The glass sleeve 26 is sealed to the periphery of a centrally apertured metal disc 27 having a stainless steel pump out tubulation 28 sealed in gas communication with the interior of the sleeve 26 through the central aperture of disc 27. A high vacuum pump 29, such as a getter ion vacuum pump, is connected in gas communication with the exhaust tubulation 28. A centrally apertured sealing flange 31 as of stainless steel is sealed to the stainless steel exhaust tubulation 28 at the central opening in the flange 31. The sealing flange 31 is detachably mated in a gas tight manner with a similar annular sealing flange 32 sealed at the lip of a cup shaped pressure vessel 33, as of stainless steel.

The boule 25 is inserted within the sleeve 26 and a stainless steel screen 34 is located between the upper end of the boule 25 and the sealing disc 27. The lower end of the glass sleeve 26 is sealed by an inwardly extending glass cup 35 with the bottom of the cup pressing a second stainless steel screen 37 into engagement with the lower end of the boule 25. Sealing cup 35 is sealed about its lip to the end of the glass sleeve 26.

The pressure vessel 33 with the boule 25 contained therein is inserted within an oven 38 containing radiant heating elements 39 around the inside walls thereof. The oven is slowly heated over a period of approximately 12 to 14 hours to a temperature of about 500° C. During this time the vacuum pump is in operation for reducing the pressure within the sleeve 26 and around the boule to a pressure of approximately $10^{-6}$ to $10^{-7}$ torr. The boule 25 attains a temperature of about 500° and is held at that temperature and at the afore-described pressure for approximately 3 to 5 hours to assure a thorough outgassing of the boule 25.

Upon outgassing of the boule, nitrogen gas is fed into the pressure chamber 33 from a nitrogen pressure source 39 via valve 41 and tubulation 42. The gas pressure fed into the pressure vessel 33 is controlled in 30 psi steps from a gauge pressure of 0 to 210 psi. Simultaneously, the temperature of the oven 38 and boule 25 is raised from 500° to 560° C. The pressure of 210 psi is held for 30 minutes at 560° C. which is approximately 40° C. below the softening point of the glass sleeve 26.

The gas pressure within the pressure vessel 33 produces a uniform compressive force over the entire outer surface of the sleeve 26, thereby pressing the sleeve and glass fibers 24 together uniformly to produce a uniform fusion between the multitude of fibers 24 and the glass sleeve 26. The uniform pressure results in a uniform fusion of all of the fibers without introducing distortion therein. Upon fusion of the glass fibers, the gas is released from the pressure vessel by opening an exhaust valve 43 in an exhaust tubulation 44 communicating through the wall of the vessel 33. The temperature of the oven 38 is then slowly decreased to room temperature, the sleeve 26 opened and the boule 25 in its final form removed.

In subsequent steps, the sleeve 26 is turned off the boule 25, the boule is sliced into plates which are subsequently etched to remove the core glass. The channelized plate is treated in a reducing atmosphere to render the inside wall of the channels in the plate semiconductive, and electrodes are affixed over opposite sides of the channelized plate.

The advantage, to drawing the individual glass fibers 1 with a vacuum drawn on the space between the core glass 2 and the sleeve 3 and fusing the hexagonal composite fibers 24 into the glass boule 25 in a vacuum, is that the resultant microchannel plate is thoroughly outgassed such that gas that would otherwise be adsorbed or absorbed in the glass or in the interfaces is removed such that when the microchannel plate is utilized in an evacuated device the plate has reduced outgassing so as not to deleteriously affect the performance of the evacuated device. More particularly, in some applications the microchannel plate is located in an evacuated image intensifier tube between a photocathode and a cathode luminescent screen or some other utilization device. Gasses which tend to diffuse out of the microchannel plate and deleteriously affect the performance and shorten the operating life of the photocathode. In this regard, it should be noted that the evacuated tube using the microchannel plate has a volume of approximately 1 cubic square inch, whereas the microchannel plate has approximately 2 square feet of area therein which is subject to outgassing. Thus, the available volume within which to distribute the gas is extremely limited.

What is claimed is:

1. In a method of fabricating microchannel electron multiplier plates comprising: cladding an etchable glass core rod with a cladding glass sleeve, said cladding glass sleeve being chemically more stable than said glass core rod; slowly heating an end-portion of said glass core rod and a surrounding glass sleeve to a temperature to collapse said glass sleeve onto said glass core rod; simultaneously drawing said glass core rod and said glass sleeve away from the heated portion of the glasses to reduce the cross-sectional dimensions of both said glass core rod and said glass sleeve to form a composite glass fiber having a core glass fiber portion clad by a surrounding glass sleeve; evacuating the region between said glass core rod and said surrounding glass sleeve, during said drawing away of said rod and sleeve, to out-gas said rod and sleeve and to remove gases from said region; assembling a plurality of composite glass fibers and drawing down said composite bundle during heating to reduce said composite bundle into a composite multifiber, creating a bundle of composite multifibers and heating the bundle to make a boule, slicing at least one plate from said boule, etching said core glass from said plate, and activating channels in said plate in a reducing atmosphere in making at least one microchannel electron multiplier plate.

2. The meted of claim 1 further comprising tacking the fibers together during the heating step.

3. In a method of making a microchannel electron multiplier plate including collapsing a heated cladding glass onto a core glass to create a composite glass fiber, drawing said composite glass fiber at a controlled rate to reduce its cross section, placing a plurality of composite glass fibers of reduced cross section together and drawing said plurality of composite glass fibers to a reduced cross section and into a composite multifiber, assembling a plurality of composite multifibers, vacuum evacuating the assembled multifibers and fusing said composite multifibers together to create a boule, slicing the boule into at least one plate, etching said plate to remove core glass, and treating said etched plate in a reducing atmosphere, the improvement comprising:

evacuating the region between the core glass and the surrounding cladding glass while drawing during the formation of said composite glass fiber to remove gas from between said core glass and said cladding glass during the making of said composite glass fiber.

4. The method of claim 3 in which said glass core rod comprises a solid core fiber portion made of an acid-etchable material clad with a more chemically stable glass.

5. The method of claim 4 in which the cladding glass is made of a lead glass and is chemically more stable when exposed to etchant material than the core glass.

6. The microchannel electron multiplier plate made in accordance with the method of claim 1.

7. The method of claim 3 in which the composite glass fibers of reduced cross section are formed into a hexagonal cross section and drawn to a reduced composite hexagonal multifiber.

8. The method of claim 3 in which said plurality of composite glass fibers of reduced cross section is heated to tack individual fibers to neighboring fibers prior to drawing said plurality of composite glass fibers to a reduced cross section and into a composite multifiber.

9. A microchannel electron multiplier plate made in accordance with the method of claim 3.

* * * * *